United States Patent [19]

Hobes et al.

[11] 4,129,472
[45] Dec. 12, 1978

[54] COMPOSITION AND USE OF ETHYLENE COPOLYMERIZATES AS FUSIBLE ADHESIVE

[75] Inventors: John Hobes, Dinslaken; Wolfgang Payer, Wesel, both of Germany

[73] Assignee: Ruhrchemie Aktiengesellschaft, Oberhausen, Germany

[21] Appl. No.: 797,550

[22] Filed: May 13, 1977

[30] Foreign Application Priority Data

May 22, 1976 [DE] Fed. Rep. of Germany ....... 2623006

[51] Int. Cl.² ............................................. C09J 5/00
[52] U.S. Cl. ..................................... 156/331; 138/141; 138/416.1; 156/309; 156/334; 156/315; 427/407 R; 427/409; 428/36; 428/461; 526/303; 526/329; 526/317
[58] Field of Search ............... 156/309, 331, 315, 334; 427/407 R, 409; 428/36, 461; 138/141, 416.1; 526/303, 329, 317; 260/897 B

[56] References Cited

U.S. PATENT DOCUMENTS

| | | | |
|---|---|---|---|
| 2,937,665 | 5/1960 | Kennedy | 428/36 |
| 3,201,374 | 8/1965 | Simms | 526/317 |
| 3,402,098 | 9/1968 | Baum et al. | 156/331 |
| 3,405,200 | 10/1968 | Yasumura et al. | 526/303 |
| 3,451,982 | 6/1969 | Mortimer | 526/303 |
| 3,523,925 | 8/1970 | Kamal et al. | 260/37 N |
| 3,546,016 | 12/1970 | Pavelich et al. | 427/302 |
| 3,557,070 | 1/1971 | Anspon et al. | 526/317 |
| 3,721,597 | 3/1973 | Colburn | 156/334 |
| 3,971,690 | 7/1976 | Birnkraut et al. | 156/309 |

*Primary Examiner*—William A. Powell
*Assistant Examiner*—J. J. Gallagher
*Attorney, Agent, or Firm*—Sprung, Felfe, Horn, Lynch & Kramer

[57] ABSTRACT

A fusion adhesive comprising an olefin copolymer comprising 70 to 95 percent by weight ethylene, 0.5 to 10 percent by weight of an amide of an unsaturated carboxylic acid and 0.5 to 15 percent by weight of an unsaturated carboxylic acid, the use of such fusion adhesive to secure two objects together, especially a polymeric plastic composition to a metal composition.

14 Claims, No Drawings

COMPOSITION AND USE OF ETHYLENE COPOLYMERIZATES AS FUSIBLE ADHESIVE

BACKGROUND OF THE INVENTION

1. Field of the Invention

This invention relates to the use, as fusion adhesives, of olefin copolymers containing carboxylic acids, carboxylic acid amides and optionally carboxylic acid ester groups, as fusion adhesives.

2. Discussion of the Prior Art

It is known that copolymers containing ethylene, acrylic acid, acrylic amide and acrylic acid esters can be used, in the form of aqueous dispersions, for coating metals. The manufacture of such dispersions and an electrochemical coating process are described in U.S. Pat. No. 3,546,016. Apart from the fact that narrow limits are imposed on the use of dispersions on account of their corrosive properties, the aforementioned coating process requires considerable technological expenditure, which makes its profitability questionable.

German Offenlegungsschrift No. 2 448 342 relates to quaternary ethylene copolymers composed of an ester of an unsaturated carboxylic acid with a saturated alcohol or a vinyl ester of a saturated carboxylic acid, the amide of an unsaturated carboxylic acid and an alkyl vinyl ether, and to the use of the copolymers as adhesives. According to German Offenlegungsschrift No. 2 400 978, terpolymers of ethylene composed of an amide of an ethylenically unsaturated carboxylic acid and an ester of an ethylenically unsaturated carboxylic acid are suitable as adhesives. Although these polymers generally show adequate performance when they are used as adhesives, their resistance to the influence of water is not always adequate, especially at high temperature.

Thus there has existed the need for a fusion adhesive which can be used where there is high mechanical stress and must therefore have certain adhesive properties (scaling resistance values) and which does not deteriorate substantially under severe conditions during prolonged storage in water. The capability of prolonged storage in water can be tested by an ageing test, which consists of storage for 72 hours in water at the high temperature of 60° C. The adhesive should also be manufactured so as to be readily reproducible.

Broadly this invention contemplates a fusion adhesive comprising an olefin copolymer said olefin copolymer comprising 70 to 95% by weight ethylene, 0.5 to 10% by weight of an amide of an unsaturated carboxylic acid and 0.5 to 15% by weight of an unsaturated carboxylic acid. Preferably, the fusion adhesive of the invention additionally contains 0.5 to 15% by weight of an ester of an unsaturated carboxylic acid with a saturated alcohol or a vinyl ester of a saturated carboxylic acid.

This invention further contemplates a method of securing two objects together which comprises disposing between the objects a fusion adhesive comprising an olefin copolymer comprising 70 to 95% by weight ethylene, 0.5 to 10% by weight of an amide of an unsaturated carboxylic acid and 0.5 to 15% by weight of an unsaturated carboxylic acid and fusing said fusion adhesive to said objects. The fusion can be performed by the use of temperature and/or pressure.

SUMMARY OF THE INVENTION

It has been found that olefin copolymers which are composed of 70–95% by weight ethylene, 0.5–10% by weight of an amide of an unsaturated carboxylic acid, 0.5–15% by weight of an unsaturated carboxylic acid and optionally 0.5–15% by weight of an ester of an unsaturated carboxylic acid with a saturated alcohol or of a vinyl ester of a saturated carboxylic acid do not have the aforementioned disadvantages. Generally, the adhesion effect on metals can be traced to acidic H atoms. Equally, two components with acidic H atoms, which make reaction with the surface of the metal possible, are represented in the copolymer of the present invention. The unsaturated carboxylic acid amide and the unsaturated carboxylic acid can be present in the same or in different amounts.

Surprisingly, the carboxyl groups, (although it might be assumed that because of the formation of hydrogen bridges they would promote the collection of water between the coat and the material) contribute to improved adhesion of the copolymer to the metal substrate. Normally it would be expected that ethylene-acrylic acid amide copolymers would hardly be suitable as adhesives where there is a high stress, inasmuch as there are present hydrophilic acid amide groups (e.g. polyacrylamide is soluble in water). The acrylester component produces a further synergistic improvement of the adhesive action, as can be seen from the examples below.

The ethylene content of the copolymer must not substantially fall below 70% by weight otherwise the fusion index of the product becomes too high. Also the ethylene content should not exceed 95% by weight or otherwise the adhesion effect of the copolymer deteriorates on account of the insufficient content of the comonomers which determine the adhesion.

According to the invention, acrylic amide, methacrylic amide and crotonic acid amide are preferably used as the amides of $\alpha$-$\beta$ ethylenically unsaturated carboxylic acids. Generally the amides are amides of $C_3$ to $C_6$ carboxylic acids, especially aliphatic, e.g., alkanoic carboxylic amides.

According to the invention, acrylic acid, methacrylic acid, ethacrylic acid, itaconic acid, fumaric acid and maleic acid are preferably used as $\alpha$-$\beta$ ethylenically unsaturated carboxylic acids with 3 to 9 carbon atoms.

Generally $C_1$ to $C_6$ alkyl and vinyl esters of $C_3$ to $C_6$ ethylenically unsaturated carboxylic acids can be optionally employed. These can be aliphatic e.g., alkanoic carboxylic acid esters. Esters of $\alpha$-$\beta$ ethylenically unsaturated carboxylic acids, which can be used as comonomers in the copolymers used as adhesives according to the invention are, for example, ethyl acrylate, n-propyl acrylate, n-butyl acrylate, tertiary butyl acrylate, tertiary butyl methacrylate, tertiary butyl crotonate, 2-ethyl hexyl acrylate, dimethyl fumarate and mono-ethyl maleate. The esters of acrylic or methacrylic acid with tertiary butyl or tertiary amyl alcohol are particularly preferred. Of the vinyl esters of saturated carboxylic acids, acetic acid vinyl ester may be mentioned.

Manufacture of the copolymers may be carried out by common polymerisation of the comonomers under high pressure in autoclaves or tube reactors. Working is usually at pressures of 1500 to 2500 bars and temperatures of 220°–290° C. The polymerization is carried out in the presence of catalytic quantities of free radical initiators.

The copolymers can be manufactured with consistent product quality in this way. They are preferably used as fusion adhesives for sticking plastics and/or other metals (e.g. polyurethane, aluminium and steel) onto metals.

The thickness of the coat of adhesive in such applications is preferably approximately 0.05–0.2 mm.

A preferred use is the sticking of plastic coats, especially polyethylene films, onto the inner and outer surfaces of metal pipes, to protect the latter against corrosion. The protection against corrosion which is provided by this means serves to preserve the pipe. Moreover, the conveyance of media which should suffer no contamination by rust, e.g. drinking water or brine in steel pipelines, which frequently have to be used for reasons of strength and economy, is made possible.

The invention is illustrated by Examples 1 to 4 below. Explanatory information and Comparative Examples 1 and 2 are given before Examples 1 to 4.

Production of the Testing System

The copolymers, which occur in varying grain size or shape of granule, were pressed on a laboratory press (Wickert steam press) into films of approximately 0.2 mm thickness. In addition, approximately 10g of the product was distributed uniformly between two glass fiber strengthened Teflon covers which are placed between 4 mm thick steel plates. Under optimal processing conditions of Pressing power: 20 kp/cm$^2$
Pressing time: 2 min.
Pressing temperature: 180° C.

films which were well plasticized throughout were obtained. Pieces of approximately 70 × 100 mm$^2$ in size were cut from these pressed films and were pressed between two aluminum or steel plates, also under the above conditions, to produce respective composite systems.

The plates (100 × 100 mm$^2$) were purified with CCl$_4$ before pressing and bent at right angles, so that a pure pressing surface of 70 × 100 mm$^2$ remained. The thickness of the plates was approximately 0.1–0.2 mm.

Testing of Adhesive Behaviour

Of the various possibilities of stress, tension, shock and scaling of a stuck (adhesive) connection, the latter may be quoted in order to enable the adhesive behaviour to be estimated. The resistance to scaling, in the case of pipes coated with polyethylene, is defined as the force which is necessary in order to peel off a certain strip of polyethylene coating over a definite scaling path. The resistance to scaling is the force per tension length which is required to loosen the connection. A distinction is made between initial cracking and further cracking force. The latter is of primary importance in regard to the adhesive strength of a system. Aluminum plates served as the components having to be bonded in the Examples.

Determination of Resistance to Scaling

Determination of resistance to scaling was effected with a Zwick tension testing machine (vertical type of construction), in whose clamping jaws the surfaces (30 × 100 mm$^2$) of the composite system, which had been bent through 90° were held. The actual bonding surface (70 × 100 mm$^2$) was perpendicular to the clamping jaws. The tension speed was 50 mm/min. The stripping or scaling forces occurring were registered by means of a recording instrument.

In each case 2 samples or, in the case of the ageing experiments 4 samples, were tested and the lowest as well as the highest value stated in the result.

Ageing Test

In order to estimate conclusively the bonding behaviour, the products were subjected to another ageing test.

In addition, the composite systems were stored (thermostat) for 72 hours in water at 60° C. and finally tested as described above.

COMPARATIVE EXAMPLE 1

A high pressure reactor was charged with a monomer mixture compressed at 2000 bars, which was composed of 98.88% by weight ethylene and 1.12% acrylic acid. Polymerization was initiated with 260 ml/hr of a 0.7% i-butyl peroctoate solution in benzine (= 83 ppm). The reaction temperature was 225° C. After a time of approximately 52 seconds of direct contact of the reaction mixture in the reactor, the polymer was removed. It contained 95% by weight ethylene and 5% acrylic acid in polymer bound form. The fusing index (MFI 190/2) was 5.3 g/10 min. The bonding properties of the product were determined by use of the aluminium/adhesive/aluminium system in accordance with the process described above.

The scaling resistance values were:

| | | |
|---|---|---|
| Before ageing | Initial cracking | 3.4 – 5.0 kp/cm |
| | Further cracking | 0.9 – 1.1 kp/cm |
| After ageing | Initial cracking | 0.5 – 1.5 kp/cm |
| | Further cracking | 0.1 – 0.3 kp/cm |

Even worse results were obtained for corresponding ethylene-acrylester and ethylene-amide copolymers whose adhesion values were already 0.1–0.3 before the ageing test.

COMPARATIVE EXAMPLE 2

Copolymerisation was carried out in a similar manner to Comparative Example 1. The copolymer obtained was composed of ethylene, 6.2% acrylamide and 9.7% n-butyl acrylate. The fusion index was 3.5 g/10 min.

The scaling resistances were:

| | | |
|---|---|---|
| Before ageing | Initial cracking | 6.7 kp/cm |
| | Further cracking | 2.9 kp/cm |

These adhesion values returned to 0–0.2 kp/cm after the seasoning test. The additional incorporation of 0.1–5% by weight alkyl vinyl ether could not retard the return of the scaling resistance values after ageing.

EXAMPLE 1

A reaction mixture composed of 97.62% by weight ethylene, 1.19% by weight methacrylic acid and 1.19% by weight acrylic amide was compressed at 2000 bars. Polymerisation was initiated with 180 ml of a 0.7% i-butyl peroctoate solution (60 ppm). The reaction temperature was 218° C. and the fusion index of the copolymer was 0.35 g/10 min. It contained 2.7% acrylic amide and 3.8% methacrylic acid in polymer bound form.

The adhesion properties of the composite aluminium-/adhesive/aluminium system were:

| Before ageing | Initial cracking | 5.8 – 8.5 kp/cm |
| --- | --- | --- |
| | Further cracking | 1.7 – 2.0 kp/cm |
| After Ageing | Initial cracking | 3.5 – 5.5 kp/cm |
| | Further cracking | 0.6 – 1.5 kp/cm |

EXAMPLE 2

The reaction mixture composed of 97.76% by weight ethylene, 1.12% by weight acrylic amide and 1.12% by weight methacrylic acid was compressed at 2000 bars. Polymerisation was initiated with 30 ppm t-butyl peroctoate (in the form of a benzine solution). The reaction temperature was 228° C. 5.3% acrylic amide and 5.1% methacrylic acid were incorporated. The fusion index was 2.6 g/10 min. The adhesion properties measured in the composite aluminum/adhesive/aluminum system were:

| Before ageing | Initial cracking | 8.8 – 15.6 kp/cm |
| --- | --- | --- |
| | Further cracking | 1.9 – 2.8 kp/cm |
| After ageing | Initial cracking | 6.0 – 8.8 kp/cm |
| | Further cracking | 0.9 – 2.0 kp/cm |

EXAMPLE 3

The reaction mixture composed of 96.25% by weight ethylene, 1.5% by weight methacrylic acid, 1.5% by weight tertiary butyl acrylate, 0.75% by weight acrylic amide was compressed at 2000 bars. Polymerization is initiated with 50 ppm tertiary butyl peroctoate in the form of a benzine solution. The reaction temperature is 230° C. 8.7% methacrylic acid, 8.0% t-butyl acrylate and 2.7% acrylic amide were incorporated. The fusion index of the reaction mixture was 11.2 g/10 min.

The adhesion properties measured on the composite aluminum/adhesive/aluminum system were as follows:

| Before Ageing | Initial cracking | 9.5 – 10.2 kp/cm |
| --- | --- | --- |
| | Further cracking | 1.4 – 3.5 kp/cm |
| After ageing | Initial cracking | 8.1 – 13.7 kp/cm |
| | Further cracking | 2.0 – 3.8 kp/cm |

EXAMPLE 4

The reaction mixture composed of 97.37% by weight ethylene, 1.06% by weight acrylic acid, 0.52% by weight tertiary butyl acrylate and 1.06% by weight acrylic amide was compressed at 2000 bars. Polymerization was initiated with 20 ppm tertiary butyl peroctoate (in the form of a benzine solution). The reaction temperature was 230° C. 6.1% acrylic acid, 4.8% tertiary butyl acrylate and 2.2% acrylic amide were incorporated. The fusion index was 0.75 g/10 min.

The adhesion properties measured in the composite aluminum/adhesive/aluminum system were as follows:

| Before ageing | Initial cracking | 9.6 – 9.8 kp/cm |
| --- | --- | --- |
| | Further cracking | 2.0 – 3.1 kp/cm |
| After ageing | Initial cracking | 10.3 – 11.8 kp/cm |
| | Further cracking | 2.0 – 3.4 kp/cm |

Preferred embodiments of the invention may be summarised as follows:

1. The use of olefin copolymers composed of 70–95% by weight ethylene, 0.5–10% by weight of the amide of an unsaturated carboxylic acid, 0.5–15% by weight unsaturated carboxylic acid as a fusion adhesive.

2. The use of olefin copolymers as in Summary 1, characterised in that acrylic amide, methacrylic amide and croton acid amide are used as amides of unsaturated carboxylic acids.

3. The use of copolymers as in Summaries 1 and 2 as fusion adhesives for bonding plastics and/or other metals to metals.

4. The use of copolymers as in Summaries 1 to 3 as fusion adhesives for bonding plastic coats, more especially polyethylene films to the inner and/or outer surface of metal pipes.

Generally speaking the olefin copolymer fusion adhesive of the present invention can be used to secure two objects together by the use of temperature and/or pressure. Generally, the olefin copolymer is heated to a temperature between 150° C. and 280° C. so as to convert the same into a form where it has fusion properties. Pressure can also be employed. The fusion adhesive of the invention can be used to secure two objects together. If can be used to secure two metal objects together or it can be used to secure a polymeric plastic composition to another polymeric plastic composition. Alternatively, it can be used to secure a polymeric plastic composition to a metal. Metals which can be secured to other metals or to polymeric plastic compositions by the use of the fusion adhesive of the present invention include: aluminum, copper, steel and their alloys.

Plastic compositions which can be secured to metals or to other plastic compositions include both thermosetting and thermoplastic compositions. Of these there must be specifically mentioned the following polymeric plastics: polyolefins, PVC, polyesters, polyamides, polycarbonates, polystyrenes.

The adhesive composition of the present invention can contain fillers, additives or adjuvents. These are generally present in an amount of between 0.5 and 40% by weight, prefereably between 1 and 10% by weight. Typical fillers which can be included in the composition are: calciumcarbonate, titaniumdioxide, soot, glass fiber etc. Stabilizers are generally present in an amount of 100 ppm to 5000 ppm. Typical stabilizers are:

4.4'-thio-bis(3-methyl-6-tert.-butyl-phenyl),
β-(3.5-di-tert.-butyl-4-hydroxyphenyl)-propionic-acid ester of pentaerythrite,
2.6-di-tert.-paracresol,
2.6-di-tert.-butylphenol,

What is claimed is:

1. A method of bonding two objects together which comprises disposing therebetween a fusion adhesive, said fusion adhesive comprising an olefin polymer comprising 70 to 95% by weight ethylene, 0.5 to 10% by weight of an amide of an unsaturated carboxylic acid and 0.5 to 15% by weight of an unsaturated carboxylic acid and fusing said objects together.

2. A method according to claim 1 wherein said olefin polymer additionally contains 0.5 to 15% by weight of an ester of an unsaturated carboxylic acid with a saturated alcohol or a vinyl ester of a saturated carboxylic acid.

3. A method according to claim 1 wherein said amide of an unsaturated carboxylic acid is acrylic acid amide, methacrylic acid amide or crotonic acid amide.

4. A method according to claim 1 wherein said unsaturated carboxylic acid is an $\alpha$-$\beta$ ethylenically unsaturated carboxylic acid have 3 to 9 carbon atoms.

5. A method according to claim 2 wherein said ester of an unsaturated carboxylic acid is ethyl acrylate, n-propyl acrylate, n-butyl acrylate, tertiary butyl acrylate, tertiary butyl methacrylate, tertiary butyl crotonate, 2-ethyl hexyl acrylate, dimethyl fumarate, monoethyl maleate, tertiary amyl acrylate, tertiary amyl methacrylate or acetic acid vinyl ester.

6. A method according to claim 1 wherein both surfaces to secure together are metallic.

7. A method according to claim 1 wherein at least one of the surfaces secured to the other surface is a plastic material and the other surface is a metal.

8. A method according to claim 7 wherein one of said surfaces is a metal pipe and the other of said surfaces is in the form of a plastic coating, the plastic coating being bonded to the inner or outer surface of said pipe.

9. A method according to claim 7 wherein the plastic material is polyethylene.

10. A method according to claim 1 wherein said objects are fused together by heating said fusion adhesive to an elevated temperature and/or pressure whereby to cause said objects to bond together.

11. A method according to claim 1 wherein said fusion adhesive is disposed between said objects at a thickness of 0.05 to 0.2 mm.

12. A fusion adhesive comprising an olefin copolymer comprising 70 to 95% by weight of ethylene, 0.5 to 10% by weight of an amide of an unsaturated carboxylic acid and 0.5 to 15% by weight of an unsaturated carboxylic acid.

13. A fusion adhesive according to claim 12 additionally containing 0.5 to 15% by weight of an ester of an unsaturated carboxylic acid with a saturated alcohol or a vinyl ester of a saturated carboxylic acid.

14. A fusion adhesive according to claim 12 containing between 0.5 and 40% by weight of additives.

* * * * *

UNITED STATES PATENT AND TRADEMARK OFFICE
CERTIFICATE OF CORRECTION

PATENT NO. : 4,129,472

DATED : December 12, 1978

INVENTOR(S) : JOHN HOBES et al.

It is certified that error appears in the above-identified patent and that said Letters Patent are hereby corrected as shown below:

Column 6, line 46, "-butyl-phenyl)" should read

-- -butyl-phenol) --.

Signed and Sealed this

Fifteenth Day of May 1979

[SEAL]

Attest:

RUTH C. MASON
Attesting Officer

DONALD W. BANNER
Commissioner of Patents and Trademarks